March 24, 1925.　　　　　　　　　　　　　　　　　　　1,530,699
J. G. ROSS ET AL
PRIMARY BATTERY
Filed March 10, 1922
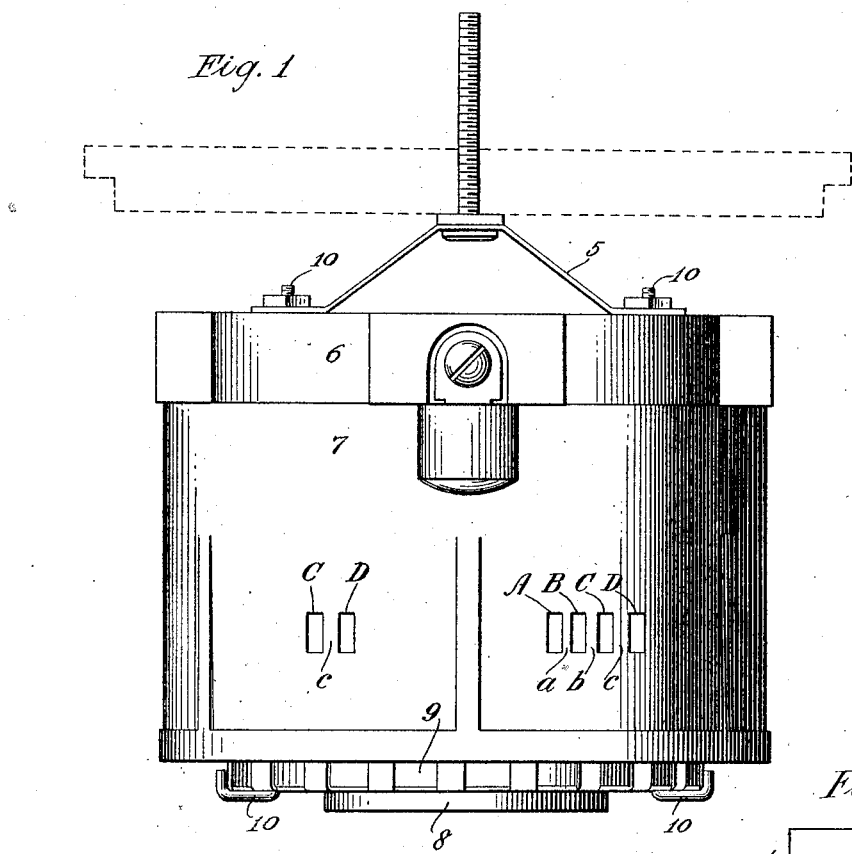
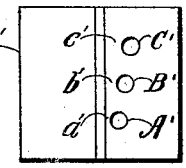
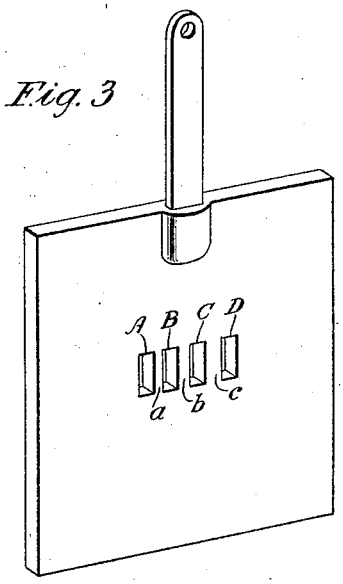
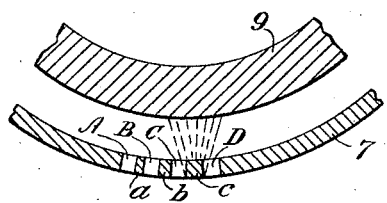
INVENTORS
James G. Ross and
Martin L. Martus
BY
Chamberlain & Newman ATTORNEYS.

Patented Mar. 24, 1925.

1,530,699

UNITED STATES PATENT OFFICE.

JAMES G. ROSS, OF WATERBURY, AND MARTIN L. MARTUS, OF WOODBURY, CONNECTICUT.

PRIMARY BATTERY.

Application filed March 10, 1922. Serial No. 542,585.

*To all whom it may concern:*

Be it known that JAMES G. Ross and MARTIN L. MARTUS, citizens of the United States, and residents of Waterbury and Woodbury, respectively, in the counties of New Haven and Litchfield, respectively, and State of Connecticut, have invented certain new and useful Improvements in Primary Batteries, of which the following is a specification.

Our invention relates to primary batteries and more particularly to electrodes for such batteries to be used in connection with co-acting electrodes and a suitable solution.

The invention more particularly relates to a battery electrode so constructed and arranged as to give advance indication to the user of its degree of consumption or state of exhaustion so that he may properly understand at a single glance its condition and thus know when renewal will be required.

The invention is particularly adapted to be applied to positive zinc electrodes, whether made of rolled sheet zinc, or cast zinc, and may be applied to zinc of uniform thickness or those tapered from top to bottom as now extensively used.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Fig. 1 shows a side elevation of a cylindrical form of assembled battery elements, the outer zinc element of which is constructed in accordance with the features of our invention;

Fig. 2 shows an enlarged cross section of a portion of the positive and negative electrodes shown in Fig. 1 with a series of lines extending from one to the other to indicate the electrolytic action as between the two;

Fig. 3 is a side elevation of a plate form of zinc or positive electrode, showing the application of the invention to this style of element; and Fig. 4 shows a modification as applied to a cylindrical form of sheet zinc electrode wherein one of the vertical edges of the element form one of the edges of the bridge.

In Fig. 1 of this drawing 5 represents a hanger by means of which the assembled element is suspended from the cover of a jar, not shown, 6 represents a porcelain insulator against which the outer positive electrode 7, the inner positive electrode 8 and the negative electrode 9 are supported by means of the tie rods 10.

The invention is particularly applicable, as will be noted, to the outer zinc electrode of a battery as indicated by 7 in the drawing, and specifically resides in the formation of a series of two or more holes or perforations in the wall of this electrode, in spaced relation one to the other and in a manner to form a body or bridge portion in the side of the zinc, of a specified area and designating a definite amount of material to be acted upon by the electrolyte and co-acting electrode.

The amount of metal as included in this bridge portion and as represented by the combined thickness of the plate and the breadth of the face of the bridge, is, according to our invention, necessarily a proper amount to designate a definite length of use of the element, in that by the continued use for a specified number of hours, said bridge portion becomes eaten away and destroyed, leaving a single opening, whereas if made wider so as to comprise a large bulk of material a greater number of hours use is necessary in order to consume the metal comprising the said bridge portion between the said openings. In this latter instance, this greater number of hours of use would indicate a further consumption of the battery with a lesser hours of use in prospect.

In case several indications for different periods of consumption are required we provide a series of holes between which different widths and amounts of material are left to form bridges of different sizes. With this form of construction the smallest bridge will first be consumed, and indicate a limited number of hours of use while the consumption of the third and widest bridge would indicate a period of consumption of the elements nearing its ultimate capacity.

These bridge portions are preferably of a uniform thickness, though the width of their faces between the said perforations varies, as for instance that portion indicated as $a$ between the holes A and B is of substantially the same width and thickness, while the next bridge indicated by $b$ positioned between the holes B and C is somewhat wider than that indicated by $a$. The bridge $c$ is considerably wider than that indicated by $b$ though its thickness would be the same as both that of $a$ and $b$. The openings A, B, C and D are all of substantially the same size and are obviously made to form the destructible bridge portions $a$, $b$ and $c$ before referred to.

The more popular size of this type of battery, as employed for railroad signal work, is designed to give as a minimum 450 ampere hour service. This may extend over a relatively long or short period of time according to the amount of use to which the battery is subjected.

It will also be understood that this standard of capacity is obtained by the use of a proper and relative amounts of the two materials employed in the formation of the positive and negative electrodes, such for instance as zinc and oxide of copper. The specified amount of the oxide of copper when employed in a battery including zinc as a positive element, can consume only a relative amount of zinc and therefore the zinc elements and copper elements are made as of certain sizes so as to avoid waste of material and insure definite results. It will therefore be further understood that a bar of zinc of specified dimensions when employed in position in a battery opposite a negative electrode will last for a specified ampere hour service and may at all times be depended upon to give like results. Consequently it will be seen that by proportioning the different width of material employed in the bridges $a$, $b$ and $c$ of the zinc they may be relied upon to withstand a definite amount of service and that as destroyed or consumed will indicate the physical condition of the battery. In the drawings we have represented bars of different thickness each designed to withstand a different amount of service as for instance $a$ as between holes A and B will be consumed in 250 ampere hour service of the battery, which to the observer will indicate that the battery was about one-half exhausted, whereas the consumption of the second bar $b$ is so proportioned as to last for a 375 ampere hour service while the third bar which is substantially twice the width of the first bar is designed to stand up for 450 hours. With the consumption of the three bars as positioned there will obviously be left one large opening which when it appears would indicate that the useful life of the battery was practically gone.

In Fig. 4 we have shown our invention as applied to a commercial form of rolled sheet zinc 7′ whose vertical spaced apart edges are disposed substantially parallel and adjacent to each other. The holes A′, B′ and C′ are arranged adjacent to one of these vertical edges and each at a different distance therefrom forming veriable, thickness of bridges $a'$, $b'$ and $c'$ whereby the action of the element will have the same effect as in the other figures, namely to first eat away the smaller bridge $a'$ and then the next bridge $b'$ and so on forming a resultant enlargement adjacent to the edge rather than between the holes.

This invention is applicable to any and all forms of zinc electrodes for primary batteries, without respect to whether they are in plate or cylinder form and may thus be included in any shape, form or design of electrode required to obtain the desired result. The features of this invention can also be applied to any positive electrode, the material of which is adapted to disintegrate, eat away or decompose during the action of the cell.

We do not therefore wish to confine ourselves to the use of zinc electrodes for the action and results obtained would be the same on other positive electrodes which disintegrate, eat away, or decompose during the action of the cell.

Having thus described our invention, what we claim and desire to secure by Letters Patent is:

1. In a primary battery, a positive element having apertures therein forming a bridge portion said bridge portion being adapted to be acted upon and consumed through the use of the battery so that the width of the bridge indicates the effective life of the battery.

2. In a primary battery, a positive electrode having apertures therein forming a plurality of reduced portions interspaced with said apertures to indicate the amount of effective battery energy available at any time during the life of the battery.

3. In a primary battery, a positive element having apertures therein a plurality of portions of various widths interspaced with said apertures, said portions indicating the amount of battery energy available at any time during the life of the battery.

4. In a primary battery, a positive element having a series of holes therethrough, and intermediate zinc bridge portions of specific and different widths designed to be consumed at different periods in the use of the battery to indicate by the thickness of said bridge portion its condition at all times during its life.

5. In a primary battery, a positive element having a series of holes therethrough, and intermediate zinc bridge portions of specific and different widths, the larger one being proportioned to be consumed with the rated ampere hours of the battery to indicate by the thickness of said bridge portion its condition at all times during its life.

6. In a primary battery the combination of negative and positive elements, the positive element having holes therethrough embodying a bridge portion, apertures adjacent thereto, said bridge portion being adapted to be acted upon electrolytically indicating from time to time the extent of battery exhaustion.

7. In a primary battery, a positive element having two or more holes therethrough and bridge portion intermediate the said holes, the walls of said bridge being transverse to the face of said element and designed to be consumed in a specified ampere hour use of the battery to indicate by the thickness of said bridge portion its condition at all times during its life.

8. In a primary battery, the combination of a negative and positive element, the positive element having an aperture therethrough and portions calibrated for width, said aperture forming said portions of the electrode calibrated for width, which portions are adapted to be acted upon during the consumption of the battery to indicate the extent of battery exhaustion.

9. In a primary battery, a positive element having a hole formed therein, the walls of which are transverse to the face of said element, whereby the decomposition of the portion surrounding said hole is intensified to indicate by the width of said hole the state of exhaustion of the element at all times during its life.

10. In a primary battery, a positive element having a portion provided with spaced side walls transverse to the face of the element, to indicate by the width of said portion the state of exhaustion of the element at all times during its life.

Signed at Waterbury, in the county of New Haven and State of Connecticut, this 2nd day of March A. D., 1922.

JAMES G. ROSS.
MARTIN L. MARTUS.

Witnesses:
HARRY T. HUBERT,
PAUL F. SCHOEUMEHL.